United States Patent
Yorifuji et al.

(10) Patent No.: US 11,458,957 B2
(45) Date of Patent: Oct. 4, 2022

(54) VEHICLE SURROUNDING DISPLAY APPARATUS

(71) Applicants: TOYOTA JIDOSHA KABUSHIKI KAISHA, Toyota (JP); DENSO TEN Limited, Kobe (JP)

(72) Inventors: Yamato Yorifuji, Toyota (JP); Kohei Maejima, Nisshin (JP); Takuya Itoh, Seto (JP); Eriko Yamazaki, Toyota (JP); Kouei Kiyo, Kobe (JP); Yukiko Hatakeyama, Kobe (JP)

(73) Assignees: TOYOTA JIDOSHA KABUSHIKI KAISHA, Toyota (JP); DENSO Corporation, Kariya (JP)

( * ) Notice: Subject to any disclaimer, the term of this patent is extended or adjusted under 35 U.S.C. 154(b) by 138 days.

(21) Appl. No.: 16/025,297

(22) Filed: Jul. 2, 2018

(65) Prior Publication Data
US 2019/0001968 A1   Jan. 3, 2019

(30) Foreign Application Priority Data
Jul. 3, 2017   (JP) .............................. JP2017-130288

(51) Int. Cl.
*B60W 30/06* (2006.01)
*H04N 5/262* (2006.01)
(Continued)

(52) U.S. Cl.
CPC ............ *B60W 30/06* (2013.01); *B60K 35/00* (2013.01); *B60R 1/00* (2013.01); *B60W 50/14* (2013.01);
(Continued)

(58) Field of Classification Search
CPC combination set(s) only.
See application file for complete search history.

(56) References Cited

U.S. PATENT DOCUMENTS 10,676,027 B2 * 6/2020 Watanabe ................ G06T 3/60
2009/0073263 A1 * 3/2009 Harada ................ G06T 3/0018
348/148
(Continued)

FOREIGN PATENT DOCUMENTS

JP   2004252837 A   *   9/2004
JP   2010069943 A   *   4/2010   ............... B60R 1/12
(Continued)

OTHER PUBLICATIONS

Stephanie Carls, "2017 Ford Escape: Letting a Car Park Itself with Enhanced Active Park Assist," (YouTube video), uploaded on Feb. 6, 2017 by user "Stephanie Carls" Retrieved from Internet on Jan. 31, 2022: https://www.youtube.com/watch?v=fswkMJx7W24 (Year: 2017).*

*Primary Examiner* — Hunter B Lonsberry
*Assistant Examiner* — Daniel M. Robert
(74) *Attorney, Agent, or Firm* — Hunton Andrews Kurth LLP

(57) ABSTRACT

A vehicle surrounding display apparatus comprises a display control means for displaying images, each of which corresponding to each of a plurality of display modes on a display screen. The display control means, when at a first mode, generates a first bird's-eye view image of a vehicle and a first surrounding region thereof seen from a bird's-eye view to display this image in a first display area with a fixed size on the display screen and generates a first another image to display this image in a second display area with a fixed size on the display screen, and when at a second mode, generates a second bird's-eye view image of a vehicle and a second surrounding region thereof wider than the first surrounding
(Continued)

region to display this image in the first display area and generates a second another image to display this image in the second display area.

18 Claims, 11 Drawing Sheets

(51) Int. Cl.
    *B60W 50/14* (2020.01)
    *G06F 3/147* (2006.01)
    *B60R 1/00* (2022.01)
    *B60K 35/00* (2006.01)
    *B62D 15/02* (2006.01)

(52) U.S. Cl.
    CPC ....... *B62D 15/027* (2013.01); *B62D 15/0285* (2013.01); *G06F 3/147* (2013.01); *H04N 5/2624* (2013.01); *H04N 5/2628* (2013.01); *B60K 2370/152* (2019.05); *B60K 2370/171* (2019.05); *B60K 2370/176* (2019.05); *B60K 2370/21* (2019.05); *B60K 2370/52* (2019.05); *B60R 2300/607* (2013.01); *B60W 2050/146* (2013.01); *B60W 2420/42* (2013.01)

(56) References Cited

U.S. PATENT DOCUMENTS

| | | | |
|---|---|---|---|
| 2014/0152774 A1* | 6/2014 | Wakabayashi | G06T 3/005 348/46 |
| 2016/0185294 A1 | 6/2016 | Miyoshi et al. | |
| 2016/0325680 A1* | 11/2016 | Curtis | B60R 1/00 |
| 2017/0355307 A1* | 12/2017 | Ha | B60Q 9/005 |
| 2018/0308358 A1* | 10/2018 | Hayakawa | G01C 21/26 |
| 2018/0354556 A1* | 12/2018 | Hirata | G06V 20/588 |

FOREIGN PATENT DOCUMENTS

| | | | |
|---|---|---|---|
| JP | 2011002884 A | | 1/2011 |
| JP | 2012056534 A | | 3/2012 |
| JP | 2012073836 A | * | 4/2012 |
| JP | 2015074258 A | | 4/2015 |
| JP | 2015076645 A | * | 4/2015 |
| JP | 2015076645 A | | 4/2015 |

* cited by examiner

VEHICLE SURROUNDING DISPLAY APPARATUS

CROSS-REFERENCE TO RELATED APPLICATION

The present application claims priority to Japanese Patent Application No. 2017-130288 filed on Jul. 3, 2017, which is incorporated herein by reference in its entirety.

TECHNICAL FIELD

The present invention relates to a vehicle surrounding display apparatus for displaying on a display screen an image (a bird's-eye view image) of a vehicle and a surrounding region thereof seen from a bird's-eye view and another image different from the bird's-eye view image.

BACKGROUND ART

A vehicle surrounding display apparatus has been conventionally known. This apparatus is mounted in a vehicle and displays on a display screen with a predetermined size a bird's-eye view image and another image different from the bird's-eye view image, the bird's-eye view image being an image of the vehicle and a surrounding region thereof seen from a bird's-eye view (for example, refer to Japanese Patent Application Laid-Open (kokai) No. 2015-76645).

A vehicle surrounding display apparatus according to the Japanese Patent Application Laid-Open (kokai) No. 2015-76645 (hereinafter, refer to as a "prior art apparatus") has a plurality of display modes depending on a driving situation of a driver. The prior art apparatus changes a display range of a surrounding region in a bird's-eye view image among these plurality of display modes. For instance, let us define that an area where the bird's-eye view image is displayed on a display screen is a first display area and an area where another image is displayed on the display screen is a second display area. Then, the prior art apparatus changes the display range of the surrounding region in the bird's-eye view image by fixing a display magnification of an own vehicle in the bird's-eye view image and changing a size of the first display area itself. Specifically, the prior art apparatus increases a size of the first display area so as to be larger than a predetermined reference size, and thereby displays the surrounding region in the bird's-eye view image in a wide display range. The prior art apparatus decreases a size of the first display area so as to be smaller than the predetermined reference size, and thereby displays the surrounding region in the bird's-eye view image in a narrow display range.

SUMMARY OF THE INVENTION

It is described in the Japanese Patent Application Laid-Open (kokai) No. 2015-76645 that according to the prior art apparatus, the display range of the surrounding region in the bird's-eye view image can be properly changed depending on the display modes. However, the prior art apparatus increases the size of the first display area itself when displaying the surrounding region in the bird's-eye view image in the wide display range, and therefore a size of the second display area may become smaller in some positional relationships (layouts) between the first display area and the second display area. In this case, it is likely that another image displayed on the second display area becomes small and thus another image is not displayed properly (that is, another image becomes difficult to see for the driver).

The present invention is made to resolve the problem above. That is, one of objects of the present invention is to provide a vehicle surrounding display apparatus capable of, in a case of displaying on a display screen a bird's-eye view image and another image different from the bird's-eye view image, properly changing a display range of a surrounding region in the bird's-eye view image between two different display modes while suitably displaying another image.

A vehicle surrounding display apparatus of the present invention (hereinafter, also referred to as a "present invention apparatus") is applied to a vehicle.

This present invention apparatus comprises;
an imaging means (12) for taking an image of a surrounding of the vehicle;
a display means including a display screen (63) with a predetermined size; and
a display control means for displaying images on the display screen (63), each of the images corresponding to each of a plurality of display modes.

The display control means is configured to;
when a first mode (PVM mode) is selected as the display mode,
generate a first bird's-eye view image (101) based on the taken image, the first bird's-eye view image (101) being an image of the vehicle (100*a*) and a first surrounding region (100*b*) of the vehicle (100*a*) seen from a bird's-eye view to display the generated first bird's-eye view image (101) in a first display area (R1) with a fixed size on the display screen (63); and
generate a first another image (102) different from the first bird's-eye view image (101) based on the taken image to display the generated first another image (102) in a second display area (R2) with a fixed size on the display screen (63), and
when a second mode (IPA mode) is selected as the display mode,
generate a second bird's-eye view image (201) based on the taken image, the second bird's-eye view image (201) being an image of the vehicle (200*a*) and a second surrounding region (200*b*) of the vehicle (200*a*) wider than the first surrounding region (100*b*) seen from a bird's-eye view to display the generated second bird's-eye view image (201) in the first display area (R1), and
generate a second another image (202) different from the second bird's-eye view image (201) based on the taken image to display the generated second another image (202) in the second display area (R2).

In the present invention apparatus, when the first mode is selected as the display mode, the display control means generates the first bird's-eye view image of the vehicle and the first surrounding region thereof seen from the bird's-eye view and displays this generated image in the first display area on the display screen. Besides, when the second mode is selected as the display mode, the display control means generates the second bird's-eye view image of the vehicle and the second surrounding region thereof wider than the first surrounding region seen from the bird's-eye view and displays this generated image in the first display area which is the same area as the area where the first bird's-eye view image is displayed. The size of this first display area is fixed. According to this configuration, the size of the first display area is prevented from being changed due to a change in the display range of the surrounding region in the bird's-eye view image, and therefore it is prevented that the size of the second display area (an area where the first another image different from the first bird's-eye view image or the second another image different from the second bird's-eye view image is displayed) on the display screen is changed. Therefore, the present invention apparatus can properly change the display range of the surrounding region in the bird's-eye view image between two different display modes while suitably displaying another image.

In another aspect of the present invention apparatus, the present invention apparatus further comprises a parking assist control means for performing a parking assist control which determines a target parking position of the vehicle, calculates a target path from a current position to the target parking position, and moves the vehicle along the target path.

The display control means is configured to;
set the display mode to the first mode (PVM mode) when the parking assist control is not being performed; and
set the display mode to the second mode (IPA mode) when the parking assist control is being performed.

According to this configuration, the display range of the surrounding region (the second surrounding region) in the bird's-eye view image (the second bird's-eye view image) of when the parking assist control is being performed becomes wider than the display range of the surrounding region (the first surrounding region) in the bird's-eye view image (the first bird's-eye view image) of when the parking assist control is not being performed. Therefore, when the parking assist control is performed, the target parking position is easily displayed in the bird's-eye view image. This enables the driver to confirm (check) the target parking position and/or whether or not there is an obstacle on the target path by referring to the bird's-eye view image. According to this configuration, the surrounding region in the bird's-eye view image can be displayed in a suitable display range for the parking assist control.

In this case, the first another image (102) and the second another image (202) are traveling direction images which are images including a region in a traveling direction of the vehicle, and the display control means is configured to narrow an angle of view of the second another image (202) compared with an angle of view of the first another image (102).

In the traveling direction image, a traveling direction front region and a traveling direction left and right region are displayed, where the traveling direction front region is a region positioned ahead of the traveling direction of the vehicle and the traveling direction left and right region is a region positioned at a left part and a right part of the traveling direction front region. According to this configuration, the angle of view of the traveling direction image (the second another image) of when the parking assist control is being performed is narrowed compared with the angle of view of the traveling direction image (the first another image) of when the parking assist control is not being performed. That is, when the parking assist control is performed, the display range of the traveling direction left and right region in the traveling direction image is narrowed compared with when the parking assist control is not performed. The size of the second display area (a display area where the traveling direction image is displayed) remains unchanged (is fixed) between two different modes. Therefore, if the display range of the traveling direction left and right region in the traveling direction image is narrowed, the traveling direction front region is displayed in a magnified manner by that amount. Hence, when the parking assist control is performed, the driver can more easily confirm a process through which the vehicle travels by referring to the traveling direction image.

Besides, in general, in a case of a relatively wide angle of view, a left and right range in an image is displayed in a relatively distorted manner, whereas in a case of a relatively narrow angle of view, the left and right range in the image is displayed with little distortion. Therefore, according to the configuration above, when the parking assist control is performed, the traveling direction front region in the traveling direction image is displayed with little distortion. Hence, the traveling direction front region in the traveling direction image can be displayed in a suitable display manner for the parking assist control.

In another aspect of the present invention apparatus, the parking assist control means is configured to determine a target stop position where the vehicle tentatively stops in order to switch a traveling direction from forward to backward, the target path includes a first path (P1) along which the vehicle travels forward from the current position to the target stop position and a second path (P2) along which the vehicle travels backward from the target stop position to the target parking position, and the display control means is configured, when the second mode (IPA mode) is selected as the display mode, to display both of the target stop position and the target parking position in the second bird's-eye view image (201) at least until the vehicle reaches the target stop position from the current position.

In this configuration, when the parking assist control is being performed, not only the target stop position but also the target parking position are displayed in the bird's-eye view image at least until the vehicle reaches the target stop position along the first path. Therefore, when the vehicle travels forward (advances) along the first path, the driver can confirm not only the first path but also the second path by referring to the bird's-eye view image. This enables the driver to check whether or not there is an obstacle not only on the first path but also on the second path, and therefore when some obstacle is detected on the target path, the parking assist control can be immediately stopped by a driving operation by the driver. According to this configuration, the surrounding region in the bird's-eye view image can be displayed in a suitable display range for the parking assist control. It should be noted that "to display both of the target stop position and the target parking position in the bird's-eye view image" means to display at least a part of the target stop position and at least a part of the target parking position in the bird's-eye view image.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
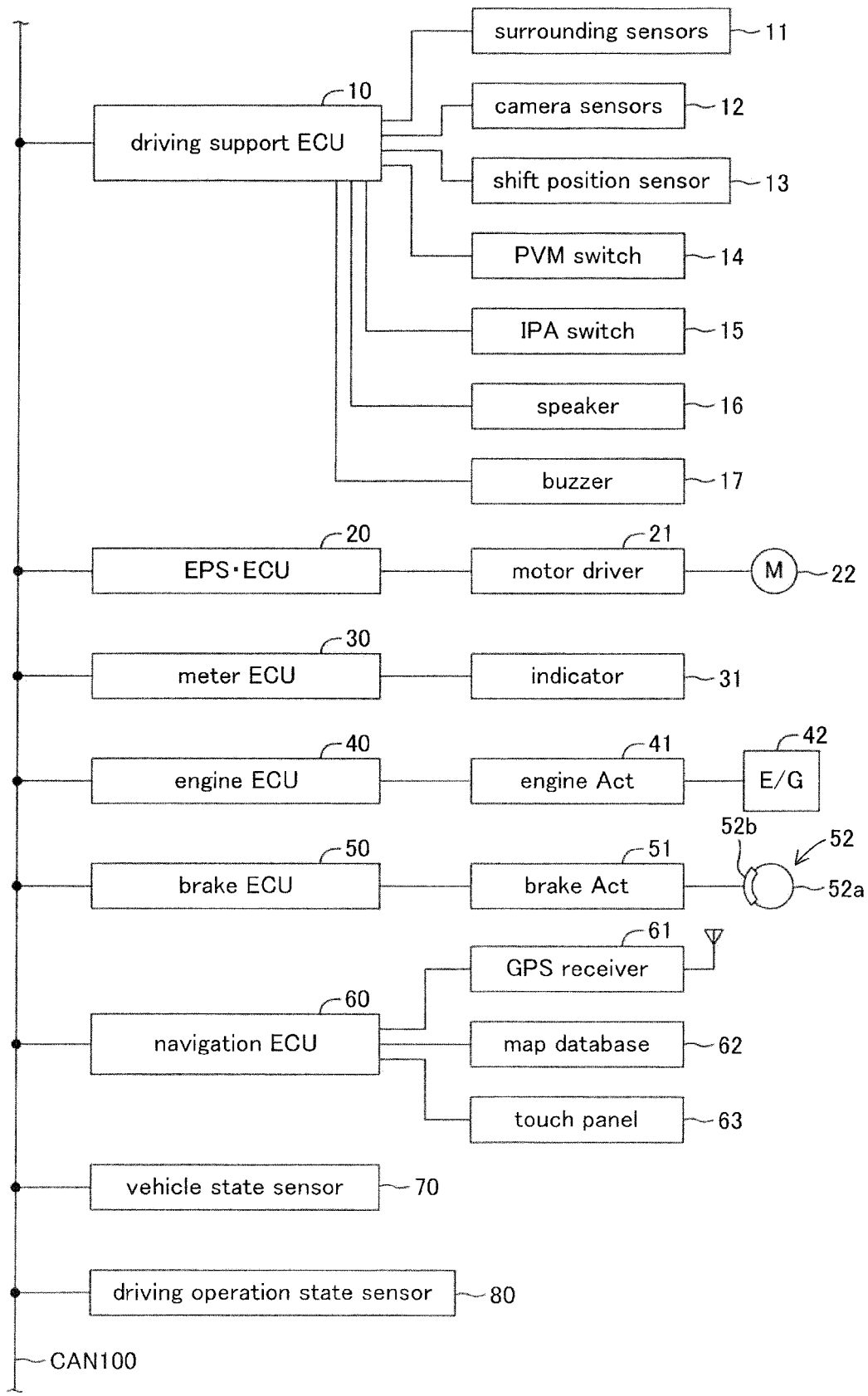
FIG. 1 is a schematic block diagram of a vehicle surrounding display apparatus (hereinafter, referred to as a "present embodiment apparatus") according to an embodiment of the present invention.

Hereinafter, a description about a vehicle surrounding display apparatus according to an embodiment of the present invention (hereinafter, also referred to as a "present embodiment apparatus") will be made, referring figures. The present embodiment apparatus is applied to a vehicle (hereinafter, may be referred to as an "own vehicle" in order to distinguish it from other vehicles), and comprises, as shown in FIG. 1, a driving support ECU 10, an electrically-driven power steering ECU (EPS•ECU) 20, a meter ECU 30, an engine ECU 40, a brake ECU 50, and a navigation ECU 60. Hereinafter the driving support ECU 10 may be also referred to as a "DSECU 10".

Each of the ECUs is an electric control unit comprising a microcomputer as a main part. Those ECUs are connected via CAN (Controller Area Network) 100 so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated to one ECU.

A plurality kinds of vehicle state sensors 70 for detecting states of the vehicle and a plurality kinds of driving operation state sensors 80 for detecting driving operation states are connected to the CAN 100. The vehicle state sensors 70 include a vehicle speed sensor for detecting a traveling speed of the vehicle, a front-rear G sensor for detecting an acceleration of the vehicle in a front-rear direction, a lateral G sensor for detecting an acceleration of the vehicle in a lateral direction, a yaw rate sensor for detecting a yaw rate of the vehicle, and the like.

The driving operation state sensors 80 include an acceleration operation amount sensor for detecting an operation amount of an accelerator pedal, a brake operation amount sensor for detecting an operation amount of a brake pedal, a brake switch for detecting whether or not a brake pedal is operated, a steering angle sensor for detecting a steering angle, a steering torque sensor for detecting a steering torque, and the like.

Information detected by the vehicle state sensors 70 and the driving operation state sensors 80 (referred to as a "sensor information") is transmitted to the CAN 100. Each of the ECUs can use the sensor information transmitted to the CAN 100. It should be noted that the sensor information is information of sensors connected to a specific ECU and may be transmitted to the CAN 100 from that specific ECU.

The DSECU 10 is a central control apparatus to perform various driving supports for the driver. The DSECU 10 displays on a display screen an image including a surrounding region of the own vehicle, a front or a rear region of the own vehicle, and the like and thereby supports (assists) the driver's driving. The display screen in the present embodiment is a touch panel 63 which will be described later and is provided at a position visible from the driver.

Surrounding sensors 11, camera sensors 12, a shift position sensor 13, a panoramic view monitor (PVM) switch 14, intelligent parking assist (IPA) switch 15, a speaker 16 and a buzzer 17 are connected to the DSECU 10. Hereinafter, the panoramic view monitor switch 14 is referred to as a "PVM switch 14" and the intelligent parking assist switch 15 is referred to as an "IPA switch 15".

The surrounding sensors 11 comprises a front center surrounding sensor 11FC, a front right surrounding sensor 11FR, a front left surrounding sensor 11FL, a rear right surrounding sensor 11RR, and a rear left surrounding sensor 11RL. Each of the surrounding sensors 11FC, 11FR, 11FL, 11RR, 11RL is a radar sensor. Although these sensors have different detection regions, they basically have same configurations with each other.

The surrounding sensors 11 comprise a radar transmission/reception part and a signal processing part (illustration omitted). The radar transmission/reception part emits an electric wave in a millimeter waveband (hereinafter, referred to as a "millimeter wave"), and receives a millimeter wave (i.e., a reflected wave) reflected from a three-dimensional object which is present in the emitted area (for example, another vehicle, a pedestrian, a bicycle, a building, and the like). The signal processing part acquires information (hereinafter, referred to as a "surrounding information") indicating a distance between the own vehicle and the three-dimensional object, a relative speed between the own vehicle and the three-dimensional object, a relative position (direction) of the three-dimensional object with respect to the own vehicle, and the like to provide the DSECU 10 with the acquired information.

Figure 2:
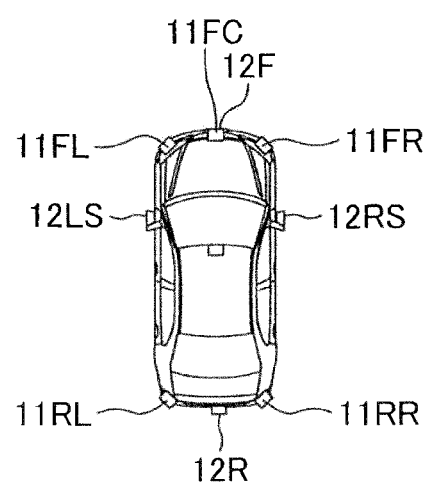
FIG. 2 is a plan view showing each of attached positions of surrounding sensors and camera sensors.

As shown in FIG. 2, the front center surrounding sensor 11FC is provided at a front center part of a vehicle body, and detects a three-dimensional object present in the front region of the own vehicle. The front right surrounding sensor 11FR is provided at a front right corner part of the vehicle body, and mainly detects a three-dimensional object present in a front right region of the own vehicle. The front left surrounding sensor 11FL is provided at a front left corner part of the vehicle body, and mainly detects a three-dimensional object present in a front left region of the own vehicle. The rear right surrounding sensor 11RR is provided at a rear right corner part of the vehicle body, and mainly detects a three-dimensional object present in a rear right region of the own vehicle. The rear left surrounding sensor 11RL is provided at a rear left corner part of the vehicle body, and mainly detects a three-dimensional object present in a rear left region of the own vehicle.

It should be noted that although the radar sensor is used as each of the surrounding sensors 11 in the present embodiment, a clearance sonar, a LIDER (light detection and ranging/laser imaging detection and ranging) sensor, or the like may be adopted instead.

The camera sensors 12 comprise a front camera sensor 12F, a right lateral camera sensor 12RS, a left lateral camera sensor 12LS, and a rear camera sensor 12R. Each of the camera sensors 12F, 12RS, 12LS, 12R is a sensor comprising a camera part to image the surrounding region. Although these sensors have different imaging ranges (regions), they basically have same configurations with each other.

Figure 3:
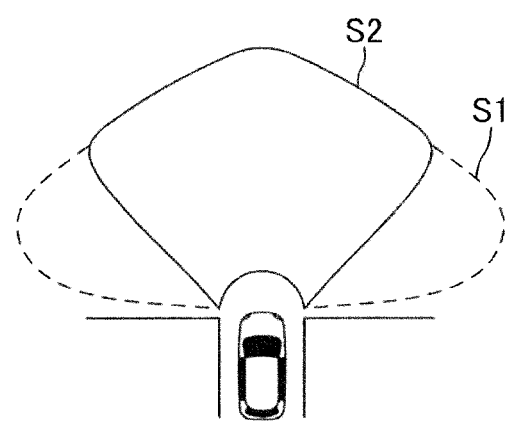
FIG. 3 is a diagram showing an imaging range S1 in which a front region of an own vehicle is imaged with a wide angle of view and an imaging range S2 in which the front region is imaged with a narrow angle of view.

The front camera sensor 12F is provided at the front center part of the vehicle body, and images the front region of the own vehicle. The right lateral camera sensor 12RS is provided at a right side mirror, and images a right lateral region of the own vehicle. The left lateral camera sensor 12LS is provided at a left side mirror, and images a left lateral region of the own vehicle. The rear camera sensor 12R is provided at a rear center part of the vehicle body, and images the rear region of the own vehicle. The front camera sensor 12F images the front region at two different angles of view (144° and 180° in the present embodiment). Similarly, the rear camera sensor 12R images the rear region at two different angles of view (144° and 180° in the present embodiment). FIG. 3 shows imaging ranges of when the front camera sensor 12F images the front region at two different angles of view. A range S1 shows an imaging range of when the front region is imaged in a wide angle of view and a range S2 shows an imaging range of when the front region is imaged in a narrow angle of view. As shown in FIG. 3, the range S1 is wider than the range S2 in a left and right direction. Therefore, an image taken in the wide angle of view has a wider display range in the left and right direction than an image taken in the narrow angle of view.

Hereinafter, image data acquired by the camera sensors 12F, 12RS, 12LS, 12R are referred to as a "front image data", a "right lateral image data", a "left lateral image data", and a "rear image data", respectively. Besides, the front image data and the rear image data taken in the narrow angle of view are referred to as a "front image data in the narrow angle of view" and a "rear image data in the narrow angle of view", respectively. Similarly, the front image data and the rear image data taken in the wide angle of view are referred to as a "front image data in the wide angle of view" and a "rear image data in the wide angle of view", respectively. These image data acquired by each of the camera sensors 12F, 12RS, 12LS, 12R are transmitted to the DSECU 10.

The DSECU 10 composite the front image data in the wide angle of view, the right lateral image data, the left lateral image data, and the rear image data in the wide angle of view, as well as a plane image of the vehicle (an image of the vehicle in a plan view) stored in the ROM of the DSECU in advance at the same display magnification (reduction scale) to generate a bird's-eye view image. Here, the bird's-eye view image means an image of the own vehicle and a surrounding region thereof which appears to be seen from a bird's-eye view (from the above), and does not mean an image actually seen from the bird's-eye view. The DSECU 10 displays, under a predetermined condition, this bird's-eye view image on the touch panel 63 (described later) connected to the navigation ECU 60. It should be noted that when generating the bird's-eye view image, the front image data in the narrow angle of view and the rear image data in the narrow angle of view may be used in place of the front image data in the wide angle of view and the rear image data in the wide angle of view.

In addition, the DSECU 10 generates, based on the front image data and the rear image data, a traveling direction image indicating a region in a traveling direction of the own vehicle. Specifically, when the own vehicle is traveling forward or has stopped while traveling forward (that is, when a shift position of a shift lever detected by the shift position sensor 13 is D or N), the DSECU 10 generates, based on the front image data, the traveling direction image indicating the front region of the own vehicle. This traveling direction image is generated for each angle of view. Hereinafter, a traveling direction image generated based on the front image data in the narrow angle of view is referred to as a "front traveling direction image in a narrow angle of view", and a traveling direction image generated based on the front image data in the wide angle of view is referred to as a "front traveling direction image in a wide angle of view".

On the other hand, when the own vehicle is traveling backward or has stopped while traveling backward (that is, when the shift position of the shift lever is R), the DSECU 10 generates, based on the rear image data, a traveling direction image indicating the rear region of the own vehicle. This traveling direction image is generated for each angle of view. Hereinafter, a traveling direction image generated based on the rear image data in the narrow angle of view is referred to as a "rear traveling direction image in a narrow angle of view", and a traveling direction image generated based on the rear image data in the wide angle of view is referred to as a "rear traveling direction image in a wide angle of view". The DSECU 10 displays on the touch panel 63, under a predetermined condition, one of these traveling direction images, depending on a driving state of the own vehicle (described later).

Further, the DSECU 10 generates, based on the right lateral image data, a right lateral image indicating the right lateral region of the own vehicle, and generates, based on the left lateral image data, a left lateral image indicating the left lateral region of the own vehicle. The DSECU 10 displays on the touch panel 63, under a predetermined condition, these images as "lateral images on both sides" (described later).

Further, the DSECU 10 analyzes the image data acquired by the camera sensors 12 to recognize a mark line which is a line dividing a parking allowed region. The DSECU 10 superimposes this mark line on the bird's-eye view image and the traveling direction image (described later).

Referring back to FIG. 1, the shift position sensor 13 detects a shift position of the non-illustrated shift lever and outputs to the DSECU 10 a signal indicating the detected shift position. The DSECU 10 acquires the shift position based on the signal received from the shift position sensor 13. It should be noted that the own vehicle is equipped with a non-illustrated known auto transmission. As already known, when a shift position of the shift lever is moved to a P range, the auto transmission is set to be in a state where the auto transmission is mechanically impossible to rotate, which enables the vehicle to maintain a stop state.

Figure 4:
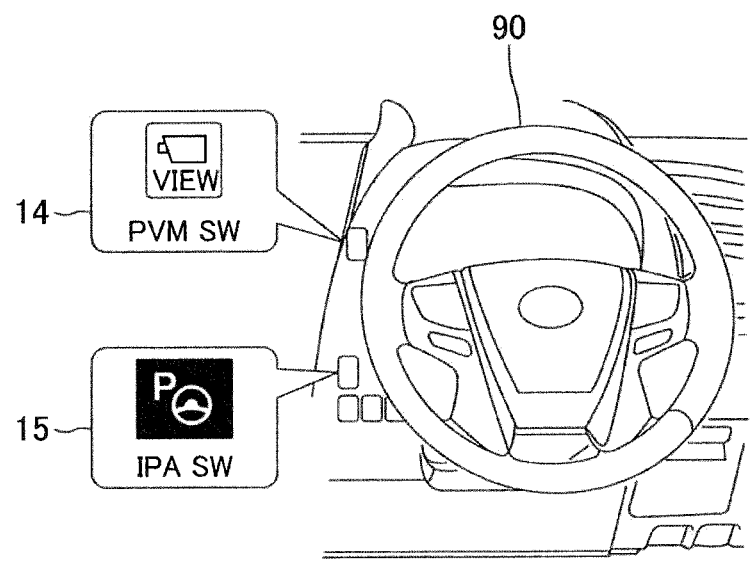
FIG. 4 is a diagram showing positions of a PVM switch and an IPA switch.

As shown in FIG. 4, the PVM switch 14 is arranged in the vicinity of a steering wheel 90 and is operated by the driver. The PVM switch 14 is a switch pressed for a purpose of switching a display mode of an image displayed on the touch panel 63 to a PVM mode. Here, PVM is a known function to assist (support) the driver's driving by displaying the surrounding region of the own vehicle on the display screen (the touch panel 63 in the present embodiment) when the own vehicle is traveling at a relatively low speed (a speed less than or equal to 12 [km/h], for instance) by the driving operation by the driver. The PVM mode is a display mode of when the PVM function is in operation. When the PVM switch 14 is pressed, a PVM pressed signal is transmitted to the DSECU 10. The DSECU 10 sets a display mode of an image displayed on the touch panel 63 to the PVM mode when receiving the PVM pressed signal. It should be noted that the PVM mode includes a plurality of display patterns, depending on the shift position and the number of times that the PVM switch 14 is pressed (described later). The PVM mode corresponds to one example of a "first mode".

As shown in FIG. 4, the IPA switch 15 is arranged in the vicinity of a steering wheel 90 and is operated by the driver. The IPA switch 15 is a switch pressed when starting a performance of a parking assist control. Here, the parking assist control is a known control to assist the driver in a parking operation (or an operation to leave a parking space) by automatically steering the steering wheel when parking the own vehicle or leaving the parking space. When the IPA switch 15 is pressed, an IPA pressed signal is transmitted to the DSECU 10. The DSECU 10 sets a display mode of an image displayed on the touch panel 63 to an IPA mode (that is, a display mode displayed during a performance of the parking assist control) when receiving the IPA pressed signal from the IPA switch 15. Hereinafter, the parking assist control is also referred to as "IPA". It should be noted that the IPA mode includes a plurality of display patterns, depending on the shift position and the number of times that the IPA switch 15 is pressed (described later). The IPA mode corresponds to one example of a "second mode".

The speaker 16 generates a voice when receiving an utterance instruction from the DSECU 10. When a message for assisting the driver's driving is displayed on the touch panel 63, the DSECU 10 makes the speaker 16 utter this message.

The buzzer 17 sounds when receiving a sounding buzzer signal from the DSECU 10. The DSECU 10 sounds the buzzer 17 when notifying the driver of a driving assist state (for example, when urging the driver to stop the own vehicle during a performance of the IPA), when warning (alerting) the driver, and so on.

The electric power steering ECU 20 is a control apparatus of an electric power steering apparatus. Hereinafter, the electric power steering ECU 20 is referred to as an EPS•ECU (Electric Power Steering ECU) 20. The EPS•ECU 20 is connected to a motor driver 21. The motor driver 21 is connected to a steered motor 22. The steered motor 22 is incorporated into a non-illustrated steering mechanism of the vehicle including "the steering wheel, a steering shaft coupled to the steering wheel, a steering gear mechanism, and the like". The EPS•ECU 20 detects a steering torque which the driver input to the steering wheel 90 (refer to FIG. 4) by using a steering torque sensor arranged at a steering shaft. The EPS•ECU 20 controls an electric conduction of the motor driver 21 based on the detected steering torque and drives the steered motor 22. When the steered motor 22 is driven, a steered angle of a non-illustrated steered wheel of the own vehicle is changed (the steered wheel is steered). A steering torque is applied to the steering mechanism by driving this assisting motor, assisting the driver in the steering operation.

Besides, when the EPS•ECU 20 receives a steering instruction from the DSECU 10 via the CAN 100 during a performance of the IPA, the EPS•ECU 20 drives the steered motor 22 with a control amount specified by the steering instruction to generate a steering torque. This steering torque is different from the steering assist torque applied in order to lighten the aforementioned steering operation (a steering wheel operation) by the driver, but is applied to the steering mechanism by the steering instruction from the DSECU 10 without the steering operation by the driver. This torque changes the steered angle of the steered wheel of the own vehicle (the steered wheel is steered).

It should be noted that when a steering torque by a steering wheel operation by the driver is detected and this steering torque is larger than a threshold, even when the EPS•ECU 20 receives a steering instruction from the DSECU 10 during a performance of the IPA, the EPS•ECU 20 prioritizes the steering wheel operation by the driver and generates the steering assist torque to lighten this operation.

The meter ECU 30 is connected to an indicator 31. The indicator 31 is, for example, a multi information display provided at a front of a driver's seat and indicates various types of information in addition to measured values such as a vehicle speed and the like by a meter. For instance, when receiving an indication instruction corresponding to a driving assist state from the DSECU 10, the meter ECU 30 indicates on the indicator 31 an image designated by the indication instruction. It should be noted that a head-up display (illustration omitted) may be adopted as the indicator 31 in place of or in addition to the multi information display.

The engine ECU 40 is connected to an engine actuator 41. The engine actuator 41 includes actuators to change a driving state of an internal combustion engine 42. The engine ECU 40 drives the engine actuator 41 to change torque which the internal combustion engine 42 generates. Thereby, the engine ECU 40 can control a driving force of the own vehicle to change an acceleration state (an acceleration rate).

The brake ECU 50 is connected to a brake actuator 51. The brake actuator 51 adjusts, in response to an instruction from the brake ECU 50, a hydraulic pressure that is supplied to a wheel cylinder which is built in the brake caliper 52*b*. Thereby, the brake actuator 51 presses a brake pad onto the brake disc 52*a* to generate a friction braking force. Accordingly, the brake ECU 50 can control a braking force of the own vehicle to change a deceleration state (a deceleration rate) by controlling the brake actuator 51.

The navigation ECU 60 is connected to a GPS receiver 61, a map database 62, a touch panel (a touch-screen display) 63, and so on. The GPS receiver 61 receives a GPS signal to detect a current position of the own vehicle. The map database 62 stores map information etc. The navigation ECU 60 identifies a position of the own vehicle at a current point in time based on the GPS signal, and performs various types of processing based on an own vehicle position and on the map information etc. stored in the map database 62 to display on the touch panel 63 a current position of the own vehicle on the map. Hereinafter, a display mode of when the current position of the own vehicle on the map is displayed on the touch panel 63 is referred to as a "navigation mode".

Display modes of images displayed on the touch panel 63 includes the aforementioned PVM mode and the IPA mode other than the navigation mode. A home button (illustration omitted) is provided in the vicinity of the touch panel 63. When a display mode is either the PVM mode or the IPA mode, the display mode is switched to the navigation mode by pressing the home button. As stated earlier, the PVM and the IPA are known technique. Therefore, in the following description, a simple description will be made for known matters whereas a detailed description will be made for new matters, referring to FIG. 5 to FIG. 8.

PVM Mode

Figure 5:
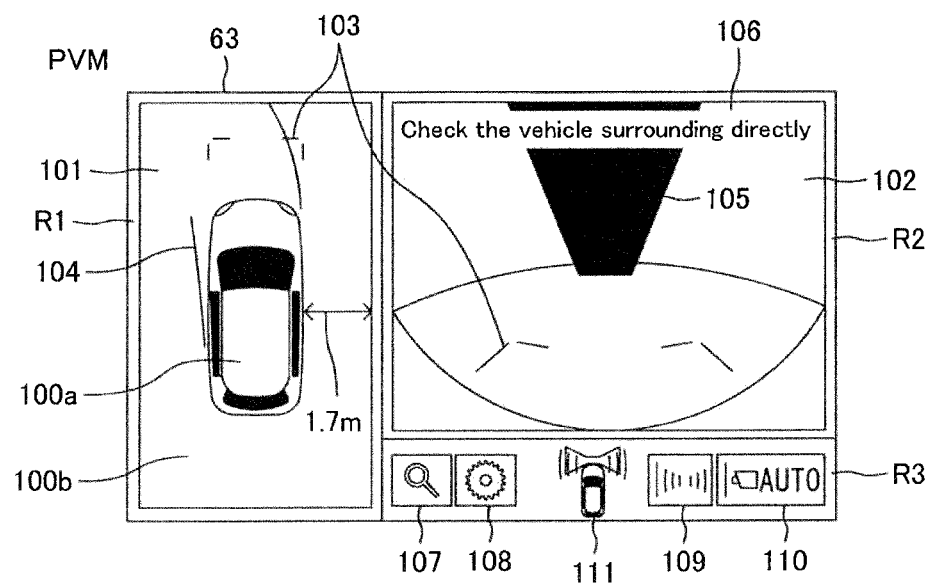
FIG. 5 is a diagram showing an image (a display pattern) displayed on a touch panel when a PVM mode is selected as a display mode.

FIG. 5 shows one example of a display pattern of when the PVM mode is selected as a display mode. This display pattern is displayed when the PVM switch 14 is pressed once with the shift position being D or N. In this example, a bird's-eye view image 101, a traveling direction image 102, various types of switches 107 to 110, and a vehicle mark 111 are displayed on the touch panel 63.

Figure 6:
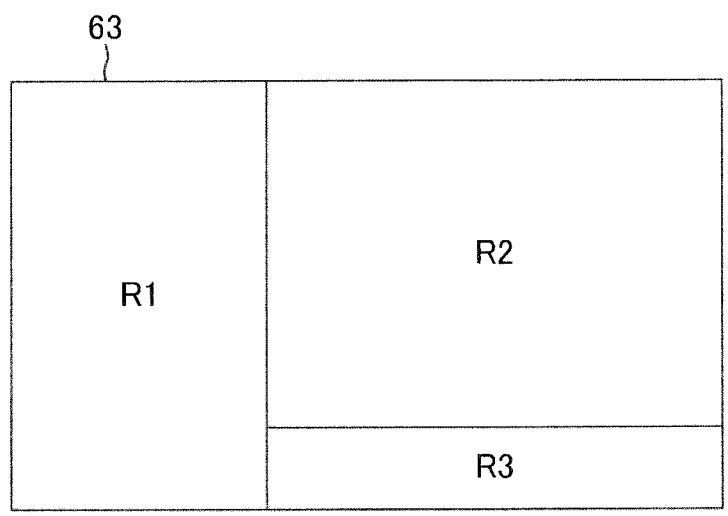
FIG. 6 is a diagram showing the touch panel (display screen) divided into three areas R1, R2, and R3.

FIG. 6 shows the touch panel 63 (hereinafter, simply referred to as a "screen") divided into three areas R1, R2, and R3. The area R1 is a left side area among two areas formed by dividing the screen into left and right areas, and has a vertically long rectangular shape. The area R2 is an upper side area among two areas formed by further dividing a right side area among the aforementioned two areas into upper and lower areas, and has a horizontally long rectangular shape. The area R3 is a lower side area among two areas formed by further dividing the right side area into upper and lower areas, and has a horizontally long rectangular shape. The areas R1 to R3 are formed by dividing the screen in such a manner that the area R2 is the largest and the area R3 is the smallest.

As shown in FIG. 5, the bird's-eye view image 101 is displayed in almost the whole part of the area R1, the traveling direction image 102 is displayed in almost the whole part of the area R2, and each of the switches 107 to 110 and the vehicle mark 111 are displayed in the area R3 side by side in a horizontal direction. When both of the bird's-eye view image and the traveling direction image are displayed on the touch panel 63 as shown in FIG. 5, a size of each area R1 to R3 (refer to FIG. 6) is kept as a predetermined size regardless of the types of the display modes (that is, the PVM mode and the IPA mode) or the types of the display pattern (that is, the display pattern of when traveling forward and the display pattern of when traveling backward). It should be noted that the bird's-eye view image 101 corresponds to one example of a "first bird's-eye view image" and the traveling direction image 102 corresponds to one example of a "first another image". Besides, the area R1 and the area R2 correspond to one example of a "first display area" and a "second display area", respectively.

The bird's-eye view image 101 is an image composed of a vehicle 100a and a surrounding region 100b thereof. The vehicle 100a is positioned in a center of the bird's-eye view image 101. In the bird's-eye view image 101, a range from a lateral edge part of a vehicle body of the vehicle 100a to a position separated from this lateral edge part by 1.7 [m] in a vehicle outward direction is displayed as the surrounding region 100b. In the surrounding region 100b, a front distance reference line 103 and a forward expected route line 104 are displayed. The front distance reference line 103 is a line indicating approximately one meter ahead from a front edge of a front bumper (illustration omitted) of the own vehicle, and is shown in blue. The forward expected route line 104 is a line indicating a reference route by working with the steering wheel operation by the driver, and is shown in yellow. Each of these lines 103 and 104 is one type of a guide line.

In the traveling direction image 102, the front distance reference line 103 and a message 106 are displayed. It should be noted that the driver may feel strange if a part of a front range of the vehicle is displayed in the traveling direction image 102 because a distance in that part may be displayed in a distorted manner, and therefore that part is hidden with a masking 105. The message 106 is a message for alerting the driver depending on a driving situation of the own vehicle. In this example, a message of "Check the vehicle surrounding directly" is displayed. This message is also uttered by the speaker 16.

The switch 107 is a switch for describing a magnification function. When this switch 107 is selected, a window for describing the magnification function for the bird's-eye view image 101 is displayed. It should be noted that the magnification function is a known function to display a part of the bird's-eye view image 101 selected by the driver in a magnified manner in the area R1.

The switch 108 is a setting switch. When this switch 108 is selected, a window for switching display modes of the guide lines and for setting a left and right confirmation support (described later) is displayed.

The switch 109 is a tentative on/off switch for the left and right confirmation support. When this switch 109 is selected, on and off of the left and right confirmation support is tentatively switched. Here, the left and right confirmation support is a known function to sound the buzzer 17 for warning and to display an approaching direction of an obstacle (a pedestrian, a bicycle, a vehicle, or the like) on the bird's-eye view image 101 and on the traveling direction image 102, and thereby to support a driver's safety confirmation in a case when the obstacle passing the front or the rear region of the own vehicle is detected by the surrounding sensors 11 when starting from a parking lot or a blind place. During a period in which the left and right confirmation support is being turned on, an operation indicator (a vertical line on a left side of a mark in the switch 109) blinks.

The switch 110 is an automatic display mode switching switch. When this switch 110 is selected, on and off of an automatic display mode is switched. Here, the automatic display mode is a known function where the bird's-eye view image 101 and the traveling direction image 102 are automatically displayed on the screen when the following two conditions are satisfied even though the PVM switch 14 is not pressed, the two conditions being that a shift position has been switched to D or N and that a vehicle speed has decreased to less than or equal to a predetermined first vehicle speed (10 [km/h], for example). During a period in which the automatic display mode is being turned on, an operation indicator (a vertical line on a left side of a mark in the switch 110) blinks.

The vehicle mark 111 is a mark indicating which direction (a left, a right, a forward, or a backward direction of the own vehicle) of an area is displayed on the traveling direction image 102. In this example, the front region of the own vehicle is displayed on the traveling direction image 102 and therefore the vehicle mark 111 has a display area positioned in front of the vehicle. It should be noted that the same mark as the mark in the switch 109 is displayed on the display area part of the vehicle mark 111 in a superimposed manner. This mark indicates whether or not the left and right confirmation support is operatable, and is displayed in a form shown in FIG. 5 when operatable and is displayed in a form where a diagonal line is added on the mark (illustration omitted) when non-operatable.

When the PVM mode is selected as a display mode, the DSECU 10 sets a display magnification of the vehicle 100a in the bird's-eye view image 101 higher than a display magnification at the IPA mode. Since the size of the area R1 in which the bird's-eye view image 101 is displayed is fixed, a higher display magnification of the vehicle 100a leads to a narrower display range of the surrounding region 100*b*. That is, when the PVM mode is selected as the display mode, the surrounding region 100*b* in the bird's-eye view image 101 is displayed in a narrow display range.

In addition, when the PVM mode is selected as a display mode, the DSECU 10 uses an image in a wide angle of view as the traveling direction image 102. That is, when traveling forward, the "front traveling direction image in a wide angle of view" is used as the traveling direction image 102, and when traveling backward (described later), the "rear traveling direction image in a wide angle of view" is used as the traveling direction image 102.

The above is a description about the display pattern displayed on the screen when the PVM switch is pressed once with the shift position being D or N. It should be noted that when the PVM switch 14 is pressed twice with the shift position being D or N, a display pattern is switched to a pattern (illustration omitted) where the aforementioned "lateral images on both sides" are displayed. This display pattern is useful as a driving support in a case when a safety confirmation at a lateral side (lateral sides) of the own vehicle is performed or in a case when the vehicle tries to avoid contacting with a building on a road with a narrow width. Besides, when the PVM switch 14 is pressed three times with the shift position being D or N, a display mode itself is switched to the navigation mode.

On the other hand, when the PVM switch 14 is pressed once with the shift position being R, either one of following three types of display patterns (illustration omitted) is displayed on the screen. That is, in a first display pattern, both of the bird's-eye view image and the traveling direction image are displayed. A surrounding region in this bird's-eye view image is displayed in a narrow display range as is the case with the above example. Besides, the "rear traveling direction image in a wide angle of view" is used as this traveling direction image. It should be noted that the bird's-eye view image is displayed in the area R1 (refer to FIG. 6) and the traveling direction image is displayed in the area R2 (refer to FIG. 6). That is, a size of an area in which the bird's-eye view image is displayed (that is, the area R1) and a size of an area in which the traveling direction image is displayed (that is, the area R2) remain unchanged (are fixed) even when a display pattern is switched to another. In a second or a third display pattern, the traveling direction image alone is displayed on almost the whole part of the screen. They are different from each other in that in the second display pattern, the "rear traveling direction image in a narrow angle of view" is used whereas in the third display pattern, the "rear traveling direction image in a wide angle of view" is used. These three display patterns can be switched to one another by the driver selecting a predetermined vehicle mark (illustration omitted) on the screen.

IPA Mode

The IPA (parking assist control) assists three types of parking and leaving a parking space, that is, a side-by-side parking, a parallel parking, and a leaving a parallel parking space. In a case of the shift position being D or N and the vehicle speed being less than or equal to a predetermined second vehicle speed (30 [km/h], for instance), a display pattern is switched to a pattern for assisting the side-by-side parking when the IPA switch 15 is pressed once, a display pattern is switched to a pattern for assisting the parallel parking when the IPA switch 15 is pressed twice, and a display mode itself is switched to the navigation mode when the IPA switch 15 is pressed three times. On the other hand, in a case of the shift position being P, a display pattern is switched to a pattern for assisting the leaving a parallel parking space when the IPA switch 15 is pressed once, and a display mode itself is switched to the navigation mode when the IPA switch 15 is pressed twice.

Although controls to assist the parallel parking and the leaving a parallel parking space differ from controls to assist the side-by-side parking in control processing, display patterns displayed on the screen are approximately the same with each other. Therefore, in the present specification, a description about a display mode of when assisting the side-by-side parking will be made, and a description about display modes of when assisting the parallel parking and the leaving the parallel parking space will be omitted.

Figure 7:
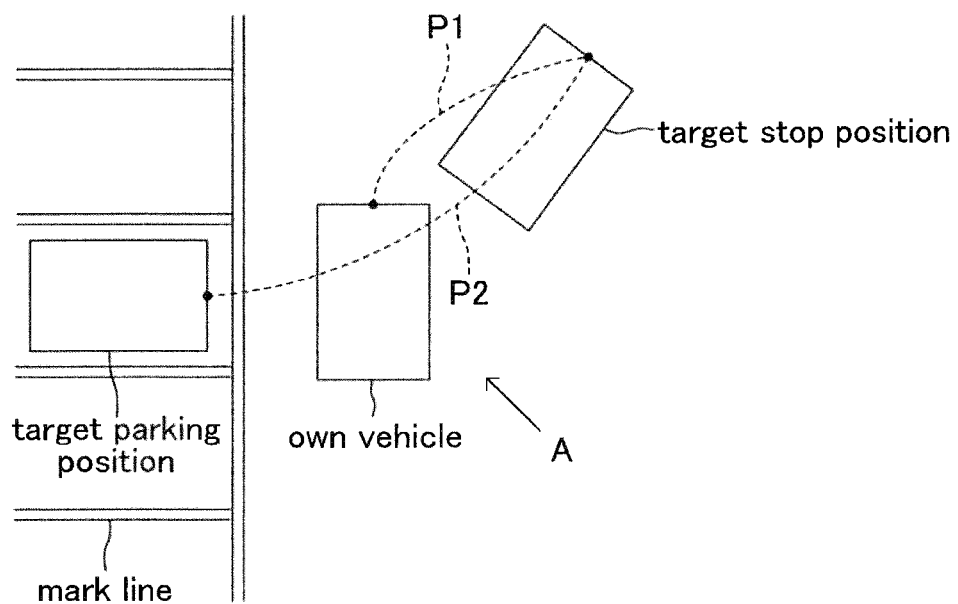
FIG. 7 is a diagram showing a first path P1 and a second path P2 during a performance of IPA.
Figure 8:
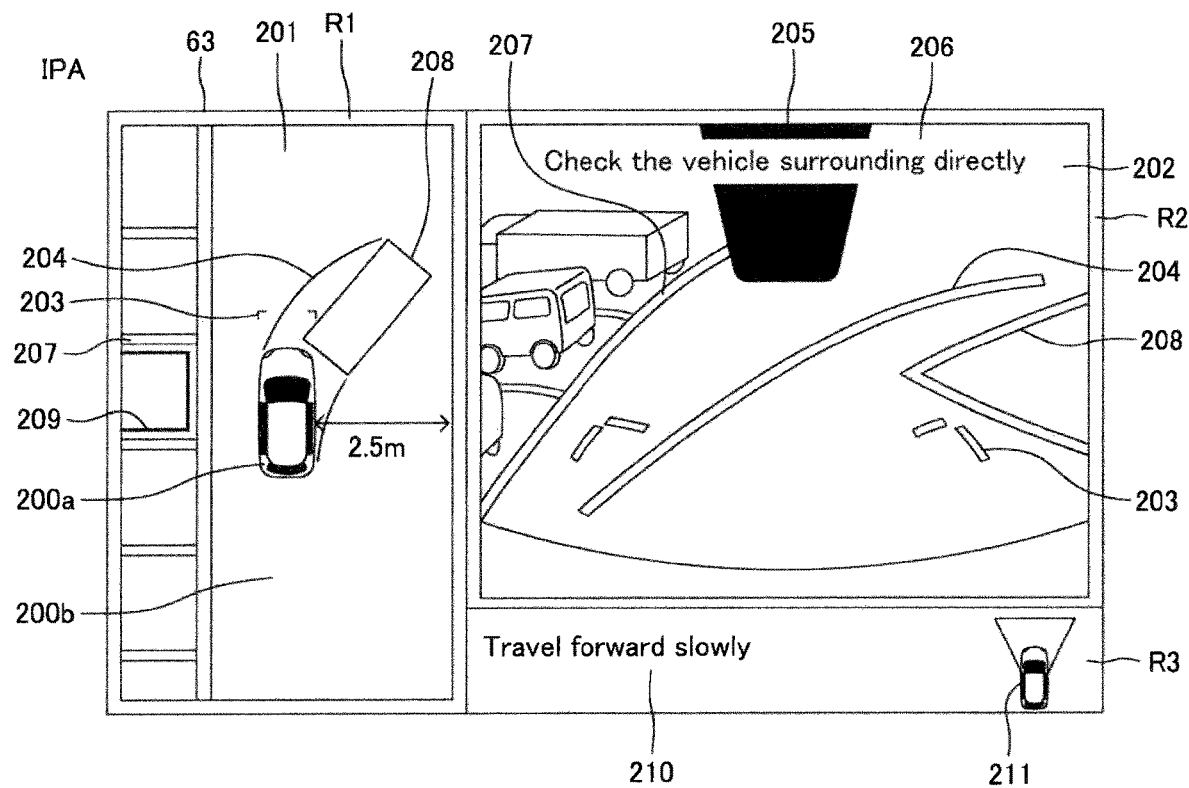
FIG. 8 is a diagram showing an image (a display pattern) displayed on a touch panel when an IPA mode is selected as a display mode.

Prior to a description about the display mode of when assisting the side-by-side parking, a summary of the IPA (hereinafter, also referred to as a "side-by-side parking assist control") of when performing the side-by-side parking will be described, referring to FIG. 7. The side-by-side parking assist control is started by the driver pressing the IPA switch 15 once with the shift position kept in D or N after the driver brings the own vehicle alongside a target parking position and tentatively stops the own vehicle (refer to a position shown by an arrow A in FIG. 7).

When the side-by-side parking assist control is started, the DSECU 10 recognizes mark lines, determines a target parking position out of a region divided by the mark lines, and determines a target stop position based on this target parking position. Thereafter, the DSECU 10 calculates a first path P1 and a second path P2 where the first path P1 is a path along which the own vehicle travels forward (advances) from a current position of the own vehicle to the target stop position, and the second path P2 is a path along which the own vehicle travels backward from the target stop position to the target parking position.

When the driver travels forward from the current position with his/her hand(s) lightly holding the steering wheel in such a manner that a vehicle speed does not exceed a predetermined third vehicle speed (7 [km/h], for example), the DSECU 10 calculates, based on the vehicle speed, a steering control amount required for the own vehicle to travel forward along the first path P1, and based on this steering control amount, automatically steers the steering wheel 90 (refer to FIG. 4). When the own vehicle approaches the target stop position, the driver is informed that the own vehicle will soon reach the target stop position with the buzzer 17, a message on the screen and the like, and thereby the driver depresses the brake pedal to stop at the target stop position.

When the driver switches the shift lever to an R range, selects an okay button (illustration omitted) on the screen, and travels backward from the target stop position in such a manner that an absolute value of the vehicle speed does not exceed the aforementioned third vehicle speed, the DSECU 10 calculates, based on the vehicle speed, a steering control amount required for the own vehicle to travel backward along the second path P2, and automatically steers the steering wheel 90 (refer to FIG. 4) based on this steering control amount. When the own vehicle approaches the target parking position, the driver is informed that the own vehicle will soon reach the target parking position with the buzzer 17, a message on the screen, and the like, and the IPA finishes. After the IPA finishes, the driver depresses the brake pedal to stop at the target parking position.

The above is a summary of the side-by-side parking assist control. Next, the display pattern of when assisting the side-by-side parking will be described, referring to FIG. 8.

This display pattern is one example of display patterns displayed when the IPA mode is selected as a display mode. More specifically, this display pattern is displayed at a stage where the own vehicle travels forward to the target stop position (that is, travels forward along the first path P1) among a plurality of stages in the side-by-side parking assist control. In this example, a bird's-eye view image 201, a traveling direction image 202, a message 210, and a vehicle mark 211 are displayed on the touch panel 63. The bird's-eye view image 201 is displayed in the area R1, the traveling direction image 202 is displayed in the area R2, and the message 210 and the vehicle mark 211 are displayed in the area R3. That is, a size of an area in which the bird's-eye view image 201 is displayed (that is, the area R1) and a size of an area in which the traveling direction image 202 is displayed (that is, the area R2) remain unchanged (are fixed) even when a display mode is switched to another type of a display mode. It should be noted that the bird's-eye view image 201 and the traveling direction image 202 correspond to one example of a "second bird's-eye view image" and a "second another image", respectively.

The bird's-eye view image 201 is an image composed of a vehicle 200a and a surrounding region 200b thereof. The vehicle 200a is positioned in a center of the bird's-eye view image 201. In the bird's-eye view image 201, a range from both lateral surfaces of the vehicle 200a to a position separated from these lateral surfaces by 2.5 [m] in the vehicle outward direction is shown as the surrounding region 200b. That is, when the IPA mode is selected as a display mode, the surrounding region in the bird's-eye view image is displayed in a wider display range than when the PVM mode is selected.

In the surrounding region 200b, a front distance reference line 203, a forward expected route line 204, a mark like 207, a target stop position 208, and a target parking position 209 are displayed. The front distance reference line 203 is a line indicating approximately one meter ahead from the front edge of the front bumper (illustration omitted) of the own vehicle, and is shown in blue. The forward expected route line 204 is a line indicating a reference route by working with the steering wheel operation by the driver, and is shown in yellow. The mark line 207 is a line dividing a parking allowed region, and is shown in white. The target stop position 208 is a line, shown in blue, indicating a position toward which the own vehicle travels forward from the current position by the automatic steering by the IPA and at which the own vehicle is to tentatively stop. The target parking position 209 is a line, shown in blue, indicating a position toward which the own vehicle travels backward from the target stop position 208 by the automatic steering by the IPA and at which the own vehicle is to be parked side by side.

In the traveling direction image 202, the front distance reference line 203, the forward expected route line 204, a message 206, the mark line 207, and the target stop position 208 are displayed. It should be noted that a masking 205 plays the same role as the masking 105 at the PVM mode. The message 206 is a message for alerting the driver depending on a driving situation of the own vehicle. In this example, a message of "Check the vehicle surrounding directly" is displayed. This message is also uttered by the speaker 16.

The message 210 is a message indicating an advice on the driving operation performed by the driver. In this example, a message of "Travel forward slowly" is displayed. This message is uttered by the speaker 16 at a different timing from a timing when the aforementioned message 206 is uttered.

The vehicle mark 211 is a mark indicating which direction (a forward or a backward direction of the own vehicle) of an area is displayed in the traveling direction image 202. In this example, the front region of the own vehicle is displayed on the traveling direction image 202 and therefore the vehicle mark 211 has a display area positioned in front of the vehicle.

When the IPA mode is selected as a display mode, the DSECU 10 sets a display magnification of the vehicle 200a in the bird's-eye view image 201 lower than a display magnification at the PVM mode. Since the size of the area R1 in which the bird's-eye view image 201 is displayed is fixed, a lower display magnification of the vehicle 200a leads to a wider display range of the surrounding region 200b. That is, when the IPA mode is selected as the display mode, the surrounding region 200b in the bird's-eye view image 201 is displayed in a wide display range.

In addition, when the IPA mode is selected as a display mode, the DSECU 10 uses an image in a narrow angle of view as the traveling direction image 202. That is, when traveling forward, the "front traveling direction image in a narrow angle of view" is used as the traveling direction image 202, and when traveling backward (described later), the "rear traveling direction image in a narrow angle of view" is used as the traveling direction image 202.

The above is a description about the display pattern for the side-by-side parking assist control at a stage of traveling forward. It should be noted that when the shift position is switched from D or N to R at the target stop position 208, either one of following three types of display patterns (illustration omitted) is displayed on the screen. That is, in a first display pattern, both of the bird's-eye view image and the traveling direction image are displayed. A surrounding region in this bird's-eye view image is displayed in a wide display range as is the case with the above example. Besides, the "rear traveling direction image in a narrow angle of view" is used as this traveling direction image. In a second or a third display pattern, the traveling direction image alone is displayed on almost the whole part of the screen. They are different from each other in that in the second display pattern, the "rear traveling direction image in a narrow angle of view" is used whereas in the third display pattern, the "rear traveling direction image in a wide angle of view" is used. These three display patterns can be switched to one another by the driver selecting a predetermined vehicle mark (illustration omitted) on the screen.

Next, a display mode switching processing performed by the DSECU 10 will be described, referring to FIG. 9. When an ignition switch is turned on, the DSECU 10 performs a routine shown by a flowchart in FIG. 9.

Figure 9:
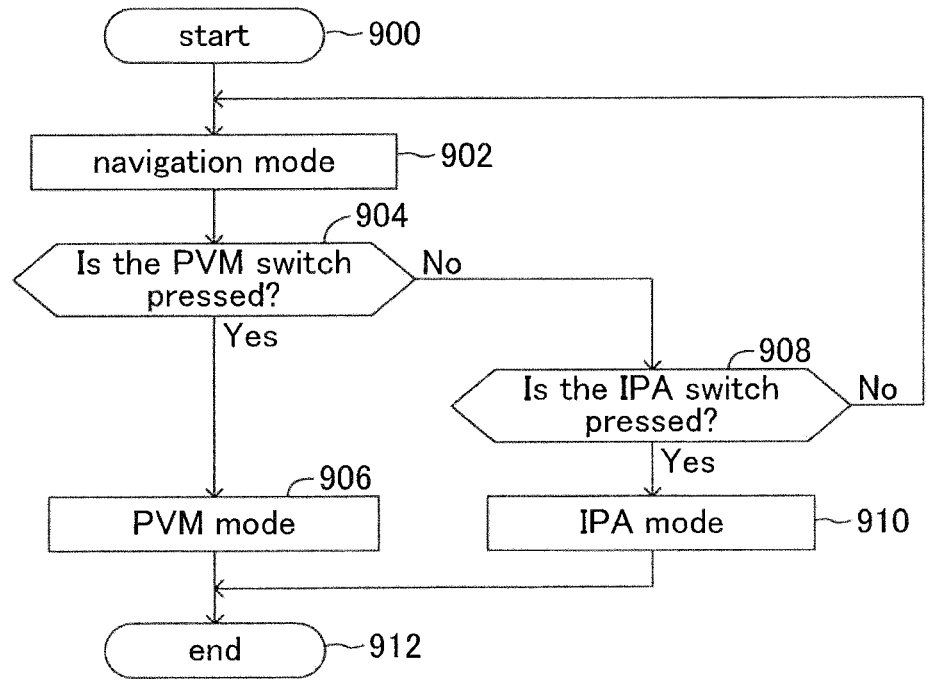
FIG. 9 is a flowchart showing a switching between two display modes.

When the DSECU 10 starts processing from a step S900 in FIG. 9 after the ignition switch is turned on, the DSECU 10 sets, at a step S902, a display mode to the navigation mode. Thereby, an image showing a current position of the own vehicle on a map is displayed on the touch panel 63.

Subsequently, the DSECU 10 proceeds to a step S904 to determine whether or not the PVM switch 14 is pressed. When it is determined that the PVM switch 14 is pressed (S904: Yes), the DSESU 10 proceeds to a step S906 to switch the display mode to the PVM mode. Thereby, among a plurality of display patterns which the PVM mode includes, a display pattern corresponding to the shift position and the number of times that the PVM switch 14 is pressed is displayed on the touch panel 63. A display at the PVM mode is finished after a predetermined period (8 seconds, for example) elapses. In this case, the DSECU 10 proceeds to a step S912 to tentatively terminate the present routine. It should be noted that as stated earlier, when the number of times that the PVM switch 14 is pressed is a multiple of three, the display mode is exceptionally switched to the navigation mode.

In contrast, when it is determined that the PVM switch 14 is not pressed at the step S904 (S904: No), the DSECU 10 proceeds to a step S908 to determine whether or not the IPA switch 15 is pressed. When it is determined that the IPA switch 15 is not pressed (S908: No), the DSECU 10 returns to the step S902 to maintain the display mode at the navigation mode.

On the other hand, when it is determined that the IPA switch 15 is pressed at the step S908 (S908: Yes), the DSECU 10 proceeds to a step 910 to switch the display mode to the IPA mode. Thereby, among a plurality of display patterns which the IPA mode includes, a display pattern corresponding to the shift position and the number of times that the IPA switch 15 is pressed is displayed on the touch panel 63. It should be noted that even when it is determined at the step 908 that the IPA switch 15 is pressed, if the vehicle speed exceeds the predetermined third vehicle speed, the DSECU 10 makes a "No" determination at the step 908. A display at the IPA mode is finished at a point in time when the IPA has finished. In addition, the display at the IPA mode is finished (is interrupted) also when a condition for continuing the IPA is not satisfied (for example, when the steering torque exceeds a threshold by the driver operating the steering wheel 90, when the vehicle speed exceeds the predetermined third vehicle speed, or the like). In these cases, the DSECU 10 proceeds to the step S912 to tentatively terminate the present routine. It should be noted that as stated earlier, when the number of times that the IPA switch 15 is pressed is a multiple of three in a case of the shift position being D or N, and when the number of times that the IPA switch 15 is pressed is a multiple of two in a case of the shift position being P, the display mode is exceptionally switched to the navigation mode. The DSECU 10 repeats the above routine every time a predetermined calculation interval elapses until the ignition switch is turned off. It should be noted that in a case of the shift position being D or N, a configuration where the display mode is exceptionally switched to the navigation mode when the number of times that the IPA switch 15 is pressed is a multiple of two may be adopted.

Effects of the present embodiment apparatus will be described. The present embodiment apparatus fixes the size of the area R1 (the area in which the bird's-eye view image 101 or the bird's-eye view image 201 is displayed) and changes a display magnification in the bird's-eye view image between two different display modes of the PVM mode and the IPA mode, and thereby changes a display range of the surrounding region in the bird's-eye view image. According to this configuration, the size of the area R1 is prevented from being changed due to a change in the display range of the surrounding region in the bird's-eye view image, and therefore it is prevented that the size of the area R2 (the area where the traveling direction image 102 or the traveling direction image 202 is displayed) is changed. Therefore, the present embodiment apparatus can properly change the display range of the surrounding region in the bird's-eye view image between two different display modes while suitably displaying the traveling direction image.

Especially, the PVM is a function to assist the driver in driving at a relatively slow speed, and is used, for example, at a road with a narrow width or at a blind intersection. The display range of the surrounding region 100b in the bird's-eye view image 101 at the PVM mode is made to be narrower than the display range of the surrounding region 200b in the bird's-eye view image 201 at the IPA mode. This enables the surrounding region 100b to be displayed in a magnified manner compared to the surrounding region 200b since the size of the area R1 in which the bird's-eye view image 101 is displayed is fixed. Therefore, during a period when the PVM mode is selected as a display mode, it becomes easy for the driver to check a situation of the surrounding region near the own vehicle by referring to the bird's-eye view image 101. Hence, a possibility that the vehicle body makes a contact with a sidewall, an obstacle on a road, and the like when traveling on a road with a narrow width can be reduced.

In addition, a usage of a wide angle of view image as the traveling direction image 102 enables the driver to easily check a situation of a left and right region in the traveling direction by referring to the traveling direction image 102. Therefore, in a case of entering a blind intersection, it becomes possible to check whether or not an obstacle such as a pedestrian, a bicycle, and a vehicle is approaching from a left or a right side before entering the intersection, and thereby a possibility to make a contact with these obstacles can be reduced.

According to the effects as stated above, the bird's-eye view image 101 and the traveling direction image 102 can be displayed on the screen in a suitable display range for a traveling at a slow speed.

On the other hand, the IPA is a function to assist the driver in a parking operation (or an operation to leave a parking space) by automatically steering the steering wheel 90, and is used when parking the own vehicle (or leaving a parking space). The display range of the surrounding region 200b in the bird's-eye view image 201 at the IPA mode is made to be wider than the display range of the surrounding region 100b in the bird's-eye view image 101 at the PVM mode. This enables the target stop position 208 and/or the target parking position 209 to be easily displayed in the surrounding region 200b since the size of the area R1 in which the bird's-eye view image 201 is displayed is fixed. Therefore, during a period when the IPA is being performed (that is, a period where the IPA mode is selected as a display mode), the driver can check, by referring to the bird's-eye view image 201, the target stop position 208 and/or the target parking position 209, or whether or not there is an obstacle on the first path P1 and/or the second path P2. Thereby, the IPA can be immediately stopped by a driving operation by the driver when some obstacle is detected on the first path P1 or the second path P2.

In addition, since the size of the area R2 in which the traveling direction image 202 is displayed is fixed, a usage of a narrow angle of view image as the traveling direction image 202 enables the front region in the traveling direction to be displayed in a magnified manner in the traveling direction image 202 compared to the corresponding region in the traveling direction image 102 at the PVM mode. Therefore, during a period when the IPA is being performed, the driver can more easily confirm a process through which the vehicle travels by referring to the traveling direction image 202.

According to the effects as stated above, the bird's-eye view image 201 and the traveling direction image 202 can be displayed on the screen in a suitable display range for the IPA.

Modification Example 1

Next, a description about a vehicle surrounding display apparatus according to a modification example 1 of the embodiment of the present invention (hereinafter, also referred to as a "first modification apparatus") will be made, referring to FIG. 10. The present modification example differs from the above embodiment in that in the above embodiment, the PVM mode and the IPA mode are both switched from the navigation mode, whereas in the present modification example, the PVM mode and the IPA mode can be switched to each other without an intervention of the navigation mode.

Figure 10:
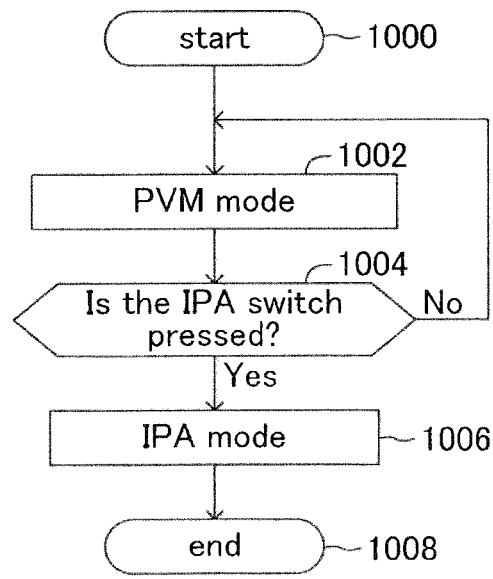
FIG. 10 is a flowchart showing a switching between two display modes of a vehicle surrounding display apparatus according to a modification example 1 of the embodiment of the present invention.

When the ignition switch is turned on, the DSECU 10 performs a routine shown by a flowchart in FIG. 10. When the DSECU starts processing from a step S1000 after the ignition switch is turned on, the DSECU 10 sets, at a step S1002, a display mode to the PVM mode. Thereby, among a plurality of display patterns which the PVM mode includes, a display pattern corresponding to the shift position and the number of times that the PVM switch 14 is pressed is displayed on the touch panel 63.

Subsequently, the DSECU 10 proceeds to a step S1004 to determine whether or not the IPA switch 15 is pressed. When it is determined that the IPA switch 15 is not pressed (S1004: No), the DSECU 10 returns to the step S1002 to maintain the display mode at the PVM mode.

On the other hand, when it is determined that the IPA switch 15 is pressed at the step S1004 (S1004: Yes), the DSECU 10 proceeds to a step 1006 to switch the display mode to the IPA mode. Thereby, among a plurality of display patterns which the IPA mode includes, a display pattern corresponding to the shift position and the number of times that the IPA switch 15 is pressed is displayed on the touch panel 63. When the IPA finishes or when the condition for continuing the IPA is not satisfied, the DSECU 10 proceeds to a step S1008 to tentatively terminate the present routine. The DSECU 10 repeats the above routine every time the predetermined calculation interval elapses until the ignition switch is turned off.

It should be noted that when the home button is pressed during a performance of the aforementioned processing, the DSECU 10 switches the display mode to the navigation mode regardless of the processing content of the present routine.

According to the configuration of the first modification apparatus, similar effects to the present embodiment apparatus can be obtained.

Modification Example 2

Next, a description about a vehicle surrounding display apparatus according to a modification example 2 of the embodiment of the present invention (hereinafter, also referred to as a "second modification apparatus") will be made, referring to FIG. 11 and FIG. 12. In the description below, the same reference numeral will be assigned to members having the same configuration as the members of the vehicle surrounding display apparatus according to the embodiment, and a detailed description for them will be omitted.

Figure 11:
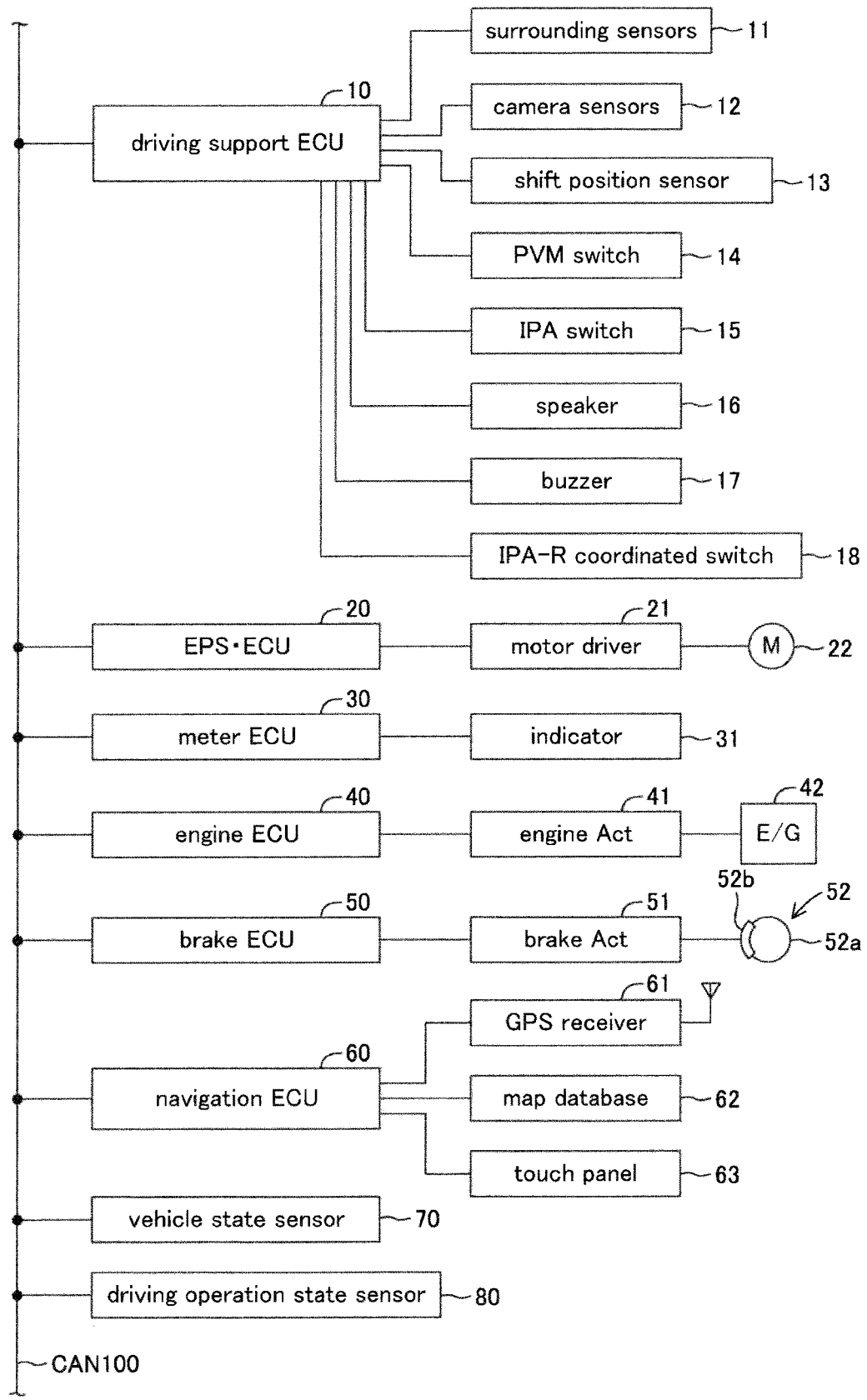
FIG. 11 is a schematic block diagram of a vehicle surrounding display apparatus according to a modification example 2 of the embodiment of the present invention (hereinafter, referred to as a "second modification apparatus").

As shown in FIG. 11, the second modification apparatus has an IPA-R coordinated switch 18 connected to the DSECU 10, which is a difference from the present embodiment apparatus. The IPA-R coordinated switch 18 is arranged in the vicinity of the PVM switch 14 and the IPA switch 15. When the IPA-R coordinated switch 18 is pressed, the IPA-R coordinated function is activated. When the driver stops the own vehicle in front of the target parking position and moves the shift lever to the R range after the IPA-R coordinated function is activated, the IPA is started in response to the moving of the shift lever even when the IPA switch 15 is not pressed. At this time, a plurality of target parking position candidates are displayed on the touch panel 63. That is, the DSECU 10 always (in other words, even when the IPA switch 15 is not pressed) recognizes mark lines and detects the target parking position candidates based on the image data acquired from the camera sensors 12. When the driver operates the steering wheel 90 to select a desired target parking position, the DSECU 10 thereafter calculates a target path (that is, a second path P2) from the current position of the own vehicle to the target parking position selected, and automatically steers the steering wheel 90 so that the own vehicle travels backward along this target path.

Next, a display mode switching processing performed by the DSECU 10 will be described, referring to FIG. 12. When the ignition switch is turned on, the DSECU 10 performs a routine shown by a flowchart in FIG. 12.

Figure 12:
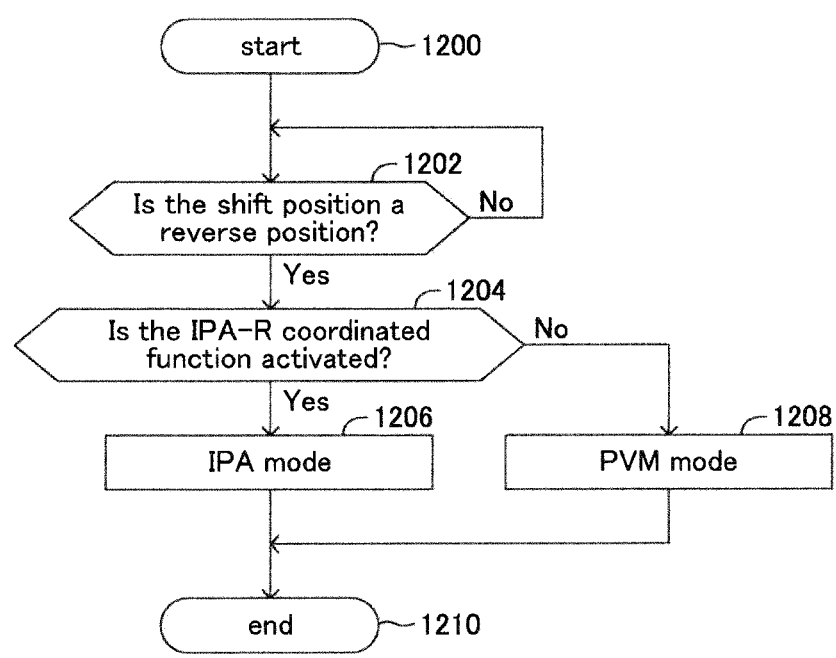
FIG. 12 is a flowchart showing a switching between two display modes of the second modification apparatus.

When the DSECU 10 starts processing from a step S1200 in FIG. 12 after the ignition switch is turned on, the DSECU 10 determines, at a step 1202, whether or not the shift position is R. When it is determined that the shift position is not R (S1202: No), the DSECU 10 again performs the processing of the step S1202. The DSECU 10 repeats the processing above until it is determined that the shift position is R.

When it is determined that the shift position is R (S1202: Yes) in the midst of repeating the processing above, the DSECU 10 proceeds to a step S1204 to determine whether or not the IPA-R coordinated switch 18 is pressed and the IPA-R coordinated function is activated. When it is determined that the IPA-R coordinated function is activated (S1204: Yes), the DSECU 10 proceeds to a step S1206 to set a display mode to the IPA mode. Thereby, among a plurality of display patterns which the IPA mode includes, a display pattern corresponding to the shift position and the number of times that the IPA switch 15 is pressed is displayed on the touch panel 63. When the IPA finishes or when the condition for continuing the IPA is not satisfied, the DSECU 10 proceeds to a step S1210 to tentatively terminate the present routine.

On the other hand, when it is determined that the IPA-R coordinated function is not activated at the step S1204 (S1204: No), the DSECU 10 proceeds to a step S1208 to set the display mode to the PVM mode. Thereby, among a plurality of display patterns which the PVM mode includes, a display pattern corresponding to the shift position and the number of times that the PVM switch 14 is pressed is displayed on the touch panel 63. Specifically, when the IPA-R coordinated function is not activated in case of the shift position being R, the DSECU 10 automatically sets the display mode to the PVM mode, not the navigation mode. Thereby, either image at the IPA mode or the PVM mode is displayed on the touch panel 63 when the vehicle travels backward (that is, when the shift position is R), and therefore the DSECU 10 can assist the driver in the driving operation.

When a display at the PVM mode is finished, the DSECU 10 proceeds to the step S1210 to tentatively terminate the present routine. The DSECU 10 repeats the above routine every time the predetermined calculation interval elapses until the ignition switch is turned off. It should be noted that in this routine, as long as the IPA-R coordinated switch 18 has been pressed, the IPA is started by shifting the shift lever to the R range also when the vehicle travels backward for a purpose of other than parking. In this case, although a plurality of the target parking position candidates are displayed on the touch panel 63 as stated above, the IPA mode is automatically terminated by the driver continuing a driving operation without selecting a target parking position. The DSECU 10 sets the PVM mode as a display mode when the shift position is R at a point in time when the IPA mode has been finished, and sets the navigation mode as a display mode when the shift position is D or N at a point in time when the IPA mode has been finished.

According to the configuration of the second modification apparatus, similar effects to the present embodiment apparatus can be obtained.

The vehicle surrounding display apparatuses according to the present embodiment and the modification examples have been described. However, the present invention is not limited to the aforementioned embodiment and may adopt various modifications within a scope of the present invention.

For example, in the embodiment described above, although the surrounding region 100*b* in the bird's-eye view image 101 is displayed in the wide display range during a performance of the IPA mode, the surrounding region 100*b* may not be always displayed in the wide display range during a performance of the IPA mode. For example, when an obstacle which may collide with the own vehicle is detected in the surrounding region by the surrounding sensors 11, the display range of the bird's-eye view image may be changed in such a manner that the surrounding region 100*b* is displayed in the narrow display range even during a performance of the IPA mode. According to this configuration, it becomes easier for the driver to recognize a three-dimensional object by referring to the bird's-eye view image, which enables the driver to take a proper action for avoiding a collision with the obstacle at a timing of the recognition. Therefore, it becomes easier to avoid a collision with an obstacle.

In addition, the following configuration may be adopted during a performance of the IPA mode. That is, the surrounding region 100*b* in the bird's-eye view image 101 may be displayed in the wide display range to a degree where the target parking position is included in the image only when the target parking position is being detected, and after the target parking position is detected and the automatic steering by the IPA is started, the surrounding region 100*b* may be displayed in the narrow display range even during a performance of the IPA mode. According to this configuration, the target parking position is displayed in the surrounding region 100*b* at a point in time when the target parking position has been detected, and therefore the IPA can be performed under a situation where the driver grasps a position at which the own vehicle is to be parked.

The invention claimed is:

1. A vehicle surrounding display apparatus applied to a vehicle comprising:
    an imaging sensor for taking an image of a surrounding of said vehicle;
    a display screen including a display screen with a predetermined size; and
    a display control unit for displaying images on said display screen, each of said images corresponding to each of a plurality of modes, wherein
    said display control unit is configured to
    set a navigation mode as a display mode from the plurality of modes;
    set a first mode as another display mode from the plurality of modes;
    generate a first bird's-eye view image based on said taken image, said first bird's-eye view image being an image of said vehicle and a first surrounding region of said vehicle, where a display range of the first surrounding region remains unchanged, and display said generated first bird's-eye view image in a first display area with a fixed size on said display screen; and
    generate a first another image different from said first bird's-eye view image based on said taken image and display said generated first another image in a second display area with another fixed size on said display screen, and
    said display control unit is further configured to
    set a second mode as another display mode from the plurality of modes;
    generate a second bird's-eye view image based on said taken image, said second bird's eye view image being an image of said vehicle and a second surrounding region of said vehicle wider than said first surrounding region, where the display range of the second surrounding region remains unchanged, and display said generated second bird's-eye view image in said first display area;
    generate a second another image different from said second bird's-eye view image based on said taken image, and display said generated second another image in said second display area; and
    the second surrounding region of said vehicle is a range from both lateral surfaces of the vehicle to a position separated from these lateral surfaces in the vehicle outward direction, and wherein
    while in the first mode, when a first mode switch is pressed and when the number of times of pressing is equal to a predetermined number, the first mode is switched to the navigation mode; and
    while in the second mode, when a second mode switch is pressed and when the number of times of pressing is equal to a predetermined number, the second mode is switched to the navigation mode.

2. The vehicle surrounding display apparatus according to claim 1, further comprising a parking assist control unit for performing a parking assist control which determines a target parking position of said vehicle, calculates a target path from a current position to said target parking position, and moves said vehicle along said target path, wherein
    said display control unit is configured to
    set said display mode to said first mode when said parking assist control is not being performed; and
    set said display mode to said second mode when said parking assist control is being performed.

3. The vehicle surrounding display apparatus according to claim 2, wherein said first another image and said second another image are traveling direction images which are images including a region in a traveling direction of said vehicle, and said display control unit is configured to narrow an angle of view of said second another image compared with an angle of view of said first another image.

4. The vehicle surrounding display apparatus according to claim 2, wherein
    said parking assist control unit is configured to determine a target stop position where said vehicle tentatively stops in order to switch a traveling direction from forward to backward,
    said target path includes a first path along which said vehicle travels forward from said current position to said target stop position and a second path along which said vehicle travels backward from said target stop position to said target parking position, and said display control unit is configured, when said second mode is selected as said display mode, to display both of said target stop position and said target parking position in said second bird's-eye view image at least until said vehicle reaches said target stop position from said current position.

5. The vehicle surrounding display apparatus according to claim 3, wherein said parking assist control unit is configured to determine a target stop position where said vehicle tentatively stops in order to switch a traveling direction from forward to backward, said target path includes a first path along which said vehicle travels forward from said current position to said target stop position and a second path along which said vehicle travels backward from said target stop position to said target parking position, and said display control unit is configured, when said second mode is selected as said display mode, to display both of said target stop position and said target parking position in said second bird's-eye view image at least until said vehicle reaches said target stop position from said current position.

6. The vehicle surrounding display apparatus according to claim 1, wherein said second mode is a mode when the vehicle is in a parking operation.

7. The vehicle surrounding display apparatus according to claim 1, wherein said first mode is a mode when the vehicle is traveling at a low speed.

8. The vehicle surrounding display apparatus according to claim 7, wherein said low speed is a speed less than or equal to 12 km/h.

9. The vehicle surrounding display apparatus according to claim 1, wherein the first bird's eye view image is configured to display a front distance reference line, and the first another image is configured to display the front distance reference line and a message for alerting a driver depending on a driving situation of the vehicle.

10. The vehicle surrounding display apparatus according to claim 1, wherein said display screen further includes a third display area and a vehicle mark and a multiple switches are displayed in the third display area.

11. The vehicle surrounding display apparatus according to claim 1, wherein a part of a front range of the vehicle displayed in the second display area is hidden with a masking.

12. The vehicle surrounding display apparatus according to claim 1, wherein the predetermined number of times of pressing being three in the first mode.

13. The vehicle surrounding display apparatus according to claim 1, wherein in the second mode, the predetermined number of times of pressing being three when a shift position being D or N, while the predetermined number of times of pressing being two when the shift position being P.

14. A vehicle surrounding display apparatus applied to a vehicle comprising:

an imaging sensor for taking an image of a surrounding of said vehicle;

a display screen including a display screen with a predetermined size; and a display control unit for displaying images on said display screen, each of said images corresponding to each of a plurality of modes, wherein said display control unit is configured to set a navigation mode as a display mode from the plurality of modes;

set a first mode as another display mode from the plurality of modes;

generate a first bird's-eye view image based on said taken image, said first bird's-eye view image being an image of said vehicle and a first surrounding region of said vehicle, and display said generated first bird's-eye view image in a first display area with a fixed size on said display screen; and generate a first another image different from said first bird's-eye view image based on said taken image and display said generated first another image in a second display area with another fixed size on said display screen, and said display control unit is further configured to set a second mode as another display mode from the plurality of modes;

generate a second bird's-eye view image based on said taken image, said second bird's eye view image being an image of said vehicle and a second surrounding region of said vehicle wider than said first surrounding region, and display said generated second bird's-eye view image in said first display area;

generate a second another image different from said second bird's-eye view image based on said taken image, and display said generated second another image in said second display area; and the second surrounding region of said vehicle is a range from both lateral surfaces of the vehicle to a position separated from these lateral surfaces in the vehicle outward direction, and a part of the second display area is hidden with a masking, and wherein while in the first mode, when a first mode switch is pressed and when the number of times of pressing is equal to a predetermined number, the first mode is switched to the navigation mode; and while in the second mode, when a second mode switch is pressed and when the number of times of pressing is equal to a predetermined number, the second mode is switched to the navigation mode.

15. The vehicle surrounding display apparatus according to claim 14, wherein said display screen further includes a third display area and a vehicle mark and multiple switches are displayed in the third display area.

16. The vehicle surrounding display apparatus according to claim 14, wherein a part of a front range of the vehicle displayed in the second display area is hidden with a masking.

17. The vehicle surrounding display apparatus according to claim 14, wherein the predetermined number of times of pressing being three in the first mode.

18. The vehicle surrounding display apparatus according to claim 14, wherein in the second mode, the predetermined number of times of pressing being three when a shift position being D or N, while the predetermined number of times of pressing being two when the shift position being P.

* * * * *